United States Patent [19]

Ohsato

[11] Patent Number: 5,159,589
[45] Date of Patent: Oct. 27, 1992

[54] OPTICAL RECORDING AND/OR REPRODUCING APPARATUS

[75] Inventor: Kiyoshi Ohsato, Chiba, Japan
[73] Assignee: Sony Corporation, Tokyo, Japan
[21] Appl. No.: 646,728
[22] PCT Filed: May 31, 1990
[86] PCT No.: PCT/JP90/00707
   § 371 Date: Jan. 31, 1991
   § 102(e) Date: Jan. 31, 1991
[87] PCT Pub. No.: WO90/15408
   PCT Pub. Date: Dec. 13, 1990

[30] Foreign Application Priority Data

Jun. 1, 1989 [JP] Japan .................. 1-139997

[51] Int. Cl.$^5$ .............................................. G11B 7/13
[52] U.S. Cl. ........................... 369/44.35; 369/44.41; 369/44.37
[58] Field of Search ............... 369/44.35, 44.37, 44.41, 369/44.42, 44.27, 44.28, 44.29, 44.32, 44.25

[56] References Cited

U.S. PATENT DOCUMENTS 4,750,162  6/1988  Tajima ..................... 369/44.37 X

FOREIGN PATENT DOCUMENTS 60-247833(A) 12/1985 Japan .
61-94246(A)   5/1986 Japan .
63-224034(A)  9/1988 Japan .

Primary Examiner—Roy N. Envall, Jr.
Assistant Examiner—Muhammad Edun
Attorney, Agent, or Firm—Philip M. Shaw, Jr.

[57] ABSTRACT

An optical recording and/or reproducing apparatus by which a main and two auxiliary light beams are caused to impinge upon a disc. Two auxiliary spots are formed on the disc by two auxiliary light beams to be distant by a quarter of a track pitch from a main spot formed on the disc by the main light beam respectively toward outer peripheral and central portions of the disc. The main and two auxiliary light beams (Lm',Lp',Ln') from the disc are detected respectively by first, second and third photodetecting elements (60,62,64) each divided into two parts to produce first, second and third difference signal (Sm,Sp,Sn) based on respectively detection outputs from two parts of the first photodetecting element, detection outputs from two parts of the second photodetecting element and detection outputs from two parts of the third photodetecting element. A tracking error signal (St) is produced based on a ratio of a difference between the first difference signal (Sm) and the sum of the second and third difference signals (Sp,Sn) in relation to a difference between the second and third difference signals (Sp,Sn) so as to have a constant amplitude without variations in response to variations in depth of a guide groove, variations in depth of each of pits or in height of each of bumps forming the record track, variations in reflectance to a light beam of the disc or variations in quantity of the light beam impinging on the disc.

3 Claims, 2 Drawing Sheets

OPTICAL RECORDING AND/OR REPRODUCING APPARATUS

TECHNICAL FIELD

The present invention relates to an optical recording and/or reproducing apparatus operative to produce a light beam to be divided into at least a main light beam and a couple of auxiliary light beam and to cause the main and auxiliary light beams to impinge upon a disc-shaped record medium for recording information thereon or reproducing information therefrom.

TECHNICAL BACKGROUND

In an optical disc player for optically recording an information signal on or optically reproducing an information signal from an optical disc-shaped record medium, an optical head device is provided for constituting an optical arrangement for causing a light beam to impinge upon the optical disc-shaped record medium so as to form a spiral record track corresponding to a recording information signal on the optical disc-shaped record medium or to read an information signal recorded in the spiral record track on the optical disc-shaped record medium.

In the optical head device, for example, a light beam produced by a light beam generating portion is collimated by a collimator lens and enters into an objective lens to be focused thereby to impinge upon the optical disc-shaped record medium, and then a reflected light beam emanating from the optical disc-shaped record medium is directed through the objective lens to a beam splitter to be changed in a direction of its optical axis thereby so as to enter into a photodetecting portion. A reproduced information signal, a focus error signal and a tracking error signal are produced based on a detection output of the reflected light beam from the photodetecting portion, and a focus servocontrol operation for maintain correct focus of the light beam projected onto the optical disc-shaped record medium and a tracking servocontrol operation for maintain the light beam in correct tracking relation to each turn of the spiral record track on the optical disc-shaped record medium are performed in accordance with the focus error signal and the tracking error signal, respectively.

As for the production of the tracking error signal, various signal producing systems including the so-called "Push-Pull system" have been known. In the Push-Pull system, the reflected light beam from the optical disc-shaped record medium is detected by a photosensor having a photodetecting element divided into two parts, and the tracking error signal is produced based on a difference in level between detection outputs obtained from two parts of the photodetecting element, respectively. In the case where the tracking error signal is produced in accordance with the Push-Pull system, although an optical arrangement for obtaining the tracking error signal and an associated signal processing circuit arrangement can be relatively simple, there is a disadvantage that a light beam spot formed on the photosensor by the reflected light beam from the optical disc-shaped record medium is undesirably moved regardless of the tracking condition of the light beam impinging upon the optical disc-shaped record medium, and therefore the tracking error signal contains undesirable DC offsets when the optical disc-shaped record medium is inclined in its radial direction to the optical axis of the objective lens through which the light beam is incident upon the optical disc-shaped record medium.

Accordingly, with the intention of avoiding the above mentioned disadvantage of the Push-Pull system, there has been proposed an improved Push-Pull system as disclosed in the Japanese patent application published before examination with laid-open number 61-94246. In this case, at least two light beams which are obtained by dividing a light beam produced by a light beam source are caused to impinge upon an optical disc-shaped record medium for forming respective light spots thereon with a space therebetween in the radial direction of the optical disc-shaped record medium, which corresponds to a distance in a predetermined relation to the track pitch of the spiral record track. Then, each of two reflected light beams from the optical disc-shaped record medium is detected by a respective photosensor having a photodetecting element divided into two parts, and a difference in level between detection outputs obtained respectively from the two parts of one photodetecting element is subjected to level adjustment for compensating a difference in strength between the two reflected light beams and then subtracted from a difference in level between detection outputs obtained respectively from the two parts of the other photodetecting element, thereby to produce the tracking error signal.

The tracking error signal thus obtained is prevented from containing DC offsets, so as properly to represent the tracking condition of the light beam impinging upon the optical disc-shaped record medium, even if it is inclined in its radial direction to the optical axis of the objective lens.

It is not seldom that the optical disc-shaped record medium on which the light beam is focused by the objective lens to impinge is provided thereon with a guide groove preformed for indicating a position where the spiral record track is to be made and further it is usual that the spiral record track comprises a plurality of pits or bumps provided to align on the optical disc-shaped record medium.

Accordingly, when the spiral record track corresponding to the recording information signal is formed to extend along the guide groove preformed on the optical disc-shaped record medium by the light beam impinging thereon or the information signal is read from the spiral record track by the light beam impinging on the optical disc-shaped record medium to scan the spiral record track, a tracking error signal varies in amplitude in response to variations in depth of the guide groove, variations in depth of each of the pits or in height of each of the bumps forming the spiral record track, variations in reflectance to a light beam of the optical disc-shaped record medium, and variations in quantity of the light beam impinging on the optical disc-shaped record medium even if it is produced in accordance with the improved Push-Pull system. In the previously proposed optical disc player, such variations in amplitude of the tracking error signal exert disadvantagious influences on the tracking servocontrol for the light beam impinging on the optical disc-shaped record medium to form the spiral record track thereon or to scan the spiral record track formed thereon.

DISCLOSURE OF THE INVENTION

Accordingly, it is an object of the present invention to provide an optical recording and/or reproducing apparatus operative to produce a light beam to be divided into a plurality of light beams and to cause the light beams to impinge upon a disc-shaped record medium for recording information thereon or reproducing information therefrom, in which a tracking error signal is so produced in accordance with the improved Push-Pull system as to be prevented from varying in amplitude in response to variations in depth of a guide groove preformed on the disc-shaped record medium, variations in depth of each of pits or in height of each of bumps forming a record track on the disc-shaped record medium, variations in reflectance to a light beam of the disc-shaped record medium or variations in quantity of the light beam impinging on the disc-shaped record medium.

According to the present invention, there is provided an optical recording and/or reproducing apparatus comprising an optical arrangement including a light beam generator for producing a light beam, light beam dividing means for dividing the light beam from the light beam generator into a main light beam and at least two auxiliary light beams, photosensing means including first, second and third photodetecting elements each divided substantially into two parts, and an optical path forming device for causing the main light beam and two auxiliary light beams obtained from the light beam dividing means to impinge upon a disc-shaped record medium and for guiding the main light beam and two auxiliary light beams emanating from the disc-shaped record medium to the photosensing means, and a signal generating circuit block operative to produce signals based on detection outputs obtained from the photosensing means. With the optical arrangement, two auxiliary light spots are formed on the disc-shaped record medium by two auxiliary light beams, respectively, in such a manner that one of the auxiliary light beam spots is distant substantially a distance corresponding to a quarter of a track pitch from a main light beam spot formed on the disc-shaped record medium by the main light beam toward an outer peripheral portion of the disc-shaped record medium along the radial direction of the disc-shaped record medium and the other of the auxiliary light beam spots is distant substantially the distance corresponding to a quarter of the track pitch from the main light beam spot on the disc-shaped record medium toward a central portion of the disc-shaped record medium along the radial direction of the disc-shaped record medium; the main light beam emanating from the disc-shaped record medium is detected by the first photodetecting element divided substantially into two parts; and two auxiliary light beams emanating from the disc-shaped record medium are detected respectively by the second and third photodetecting elements each divided substantially into two parts. The signal producing circuit block is constituted to obtain a first difference between detection output signals obtained respectively from the two parts of the first photodetecting element, a second difference between detection output signals obtained respectively from the two parts of the second photodetecting element and a third difference between detection output signals obtained respectively from the two parts of the third photodetecting element, and then to produce a tracking error signal based on a ratio of a difference between the first difference and the sum of the second and third differences in relation to a difference between the second and third differences.

In the optical recording and/or reproducing apparatus thus constituted in accordance with the present invention, the main and two auxiliary beams which are used for producing the tracking error signal are controlled to form on the disc-shaped record medium the main and two auxiliary light beam spots arranged in the manner that two auxiliary light beam spots are respectively distant substantially the same distance corresponding to a quarter of the track pitch from the main light beam spot along the radial direction of the disc-shaped record medium so that the main light beam spot is put between the auxiliary light beam spots, and then detected by the first, second and third photodetecting elements each divided substantially two parts, respectively. Then, the first difference between the detection output signals obtained respectively from two parts of the first photodetecting element, the second difference between the detection output signals obtained respectively from two parts of the second photodetecting element, and the third difference between the detection output signals obtained respectively from two parts of the third photodetecting element are obtained, and the tracking error signal is produced by dividing the difference between the first difference and the sum of the second and third differences with the difference of the second and third differences. The use of the difference between the first difference and the sum of the second and third differences in such a manner as mentioned above results in that the tracking error signal is produced in accordance with the improved Push-Pull system. Further, the difference between the second and third differences becomes a component constituting the tracking error signal without a DC component and the ratio of the difference between the first difference and the sum of the second and third differences in relation to the difference of the second and third differences is almost constant, and therefore the tracking error signal produced as mentioned above is almost constant in amplitude without variations in response to the variations in depth of the guide groove preformed on the disc-shaped record medium, the variations in depth of each of the pits or in height of each of the bumps forming the record track on the disc-shaped record medium, the variations in reflectance to a light beam of the disc-shaped record medium or the variations in quantity of the light beam impinging on the disc-shaped record medium.

Consequently, with the optical recording and/or reproducing apparatus according to the present invention, the main and two auxiliary beams which are used for producing the tracking error signal are caused to impinge upon the disc-shaped record medium for forming thereon the main and two auxiliary light beam spots arranged in the manner that two auxiliary light beam spots are distant substantially the same distance corresponding to a quarter of the track pitch from the main light beam spot along the radial direction of the disc-shaped record medium respectively toward the outer peripheral and central portions of the disc-shaped record medium, and each of the main and two auxiliary light beams emanating from the disc-shaped record medium is detected by the photodetecting element divided substantially two parts. Then, the tracking error signal is produced based on the difference between the detection outputs obtained from two part of the photodetecting element by which the main light beam is detected and the difference between the detection outputs obtained from two part of each of the photodetecting element by which the auxiliary light beam is detected. Therefore, the tracking error signal which is produced in accordance with the improved Push-Pull system to have an almost constant amplitude without variations in response to the variations in depth of the guide groove preformed on the disc-shaped record medium, the variations in depth of each of the pits or in height of each of the bumps forming the record track on the disc-shaped record medium, the variations in reflectance to a light beam of the disc-shaped record medium or the variations in quantity of the light beam impinging on the disc-shaped record medium, can be obtained.

EMBODIMENT MOST PREFERABLE FOR WORKING OF THE INVENTION

Figure 1:
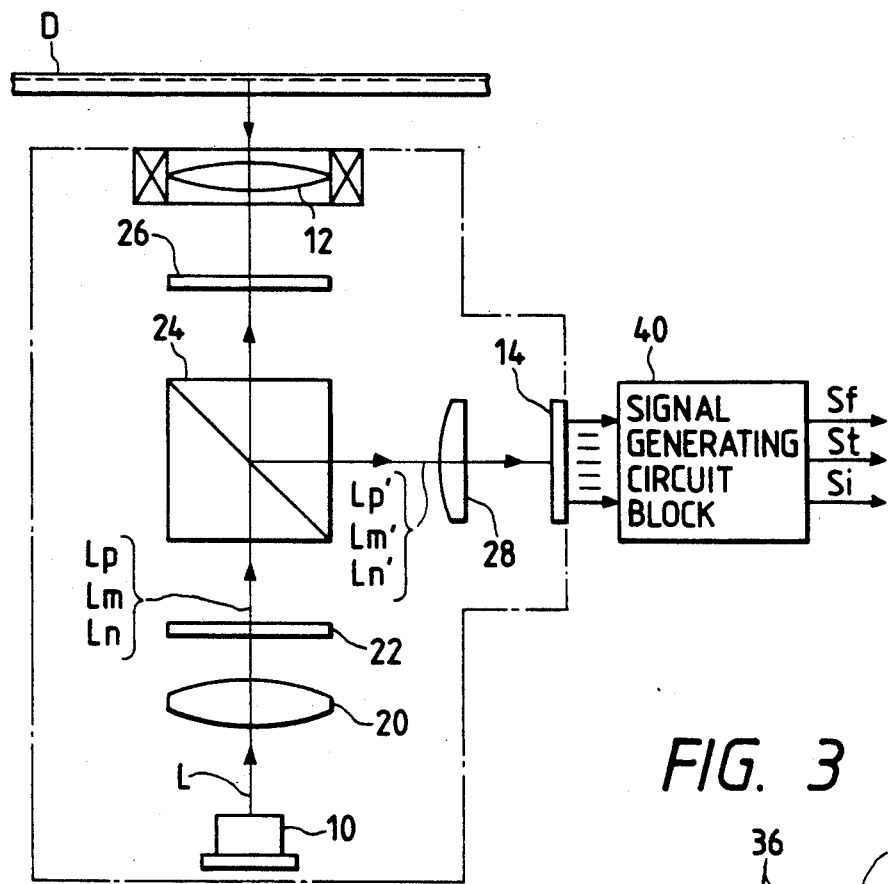
FIG. 1 is a schematic illustration showing part of one embodiment of optical recording and/or reproducing apparatus according to the present invention.

FIG. 1 shows schematically an optical unit and a signal generating circuit block which forms essential parts of an embodiment of optical recording and/or reproducing apparatus according to the present invention. The essential pars of the embodiment shown in FIG. 1 constitute an information reproducing system applied to, for example, an optical disc player, in which the optical unit comprises a semiconductor laser device 10 for generating a laser light beam L, an objective lens 12 and a photodetector 14 and is provided to be able to move in a radial direction of a disc D which is an optical disc-shaped record medium.

The laser light beam L generated by the semiconductor laser device 10 is collimated by a collimator lens 20 and then enters into a grating 22. In the grating 22, the laser light beam L is divided into three light beams including a center beam and first and second side beams positioned at both sides of the center beam. The center beam serves as main light beam Lm and the first and second side beams serve as auxiliary light beams Lp and Ln, respectively. For the sake of simple illustration, these main and auxiliary light beams Lm, Lp and Ln are shown with a single line in FIG. 1. Then, each of the main light beam Lm and the auxiliary light beams Lp and Ln obtained from the grating 22 passes through a polarized beam splitter 24 without changing the direction of its optical axis and then through a ¼-wave plate 26 to the objective lens 12 and is focused by the objective lens 12 to impinge upon the disc D.

Figure 2:
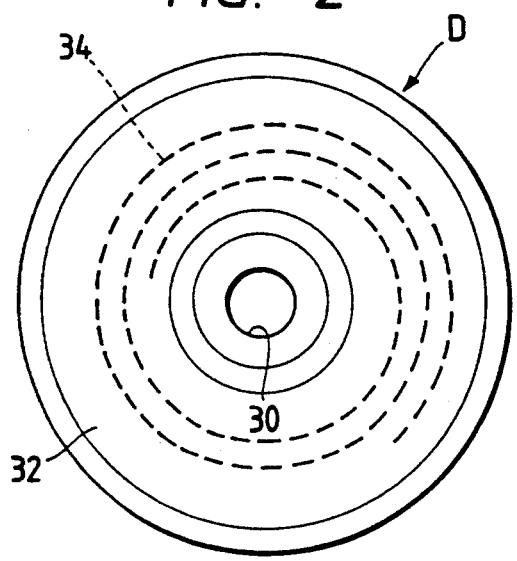
FIG. 2 is a schematic plan view showing an example of an optical disc used in the embodiment shown in FIG. 1.

As shown in FIG. 2, the disc D is provided with a center hole 30 and an information recording area 32 around the center hole 30. On the information recording area 32, a spiral guide groove 34 is preformed to surround the center hole 30 and a spiral record track is to be formed along the spiral guide groove 34. The spiral record track is to have a track pitch (a distance between centers of two adjacent turns of the spiral record track) of, for example, about 1.6 μm and each turn of the spiral record track is defined to be one track for convenience's sake.

The main light beam Lm and the auxiliary light beams Lp and Ln incident upon the disc D are modulated in intensity by the spiral guide groove 34 or the spiral record and reflected auxiliary light beams Lp' and Ln'. Each of the reflected main light beam Lm' and reflected auxiliary light beams Lp' and Ln' from the disc D passes through the objective lens 12 and the ¼-wave plate 26 to the polarized beam splitter 24. Then, each of the reflected main light beam Lm' and reflected auxiliary light beams Lp' and Ln' is deflected at the polarized beam splitter 24 so as to pass to the photodetector 14 through a receiving lens 28.

Figure 3:
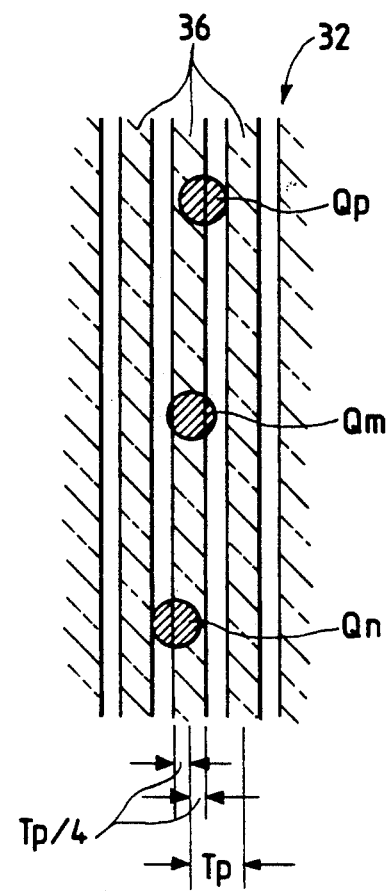
FIG. 3 is a schematic illustration showing light beam spots formed on a disc by main and auxiliary light beams in the embodiment shown in FIG. 1.

The objective lens 12, polarized beam splitter 24, ¼-wave plate 26 and the receiving lens 28 inclusive constitute an optical path forming device which is operative to cause the main light beam Lm and the auxiliary light beams Lp and Ln obtained from the grating 22 to impinge upon the disc D and to guide the reflected main light beam Lm' and reflected auxiliary light beams Lp' and Ln' emanating from the disc D to the photodetector 14. The optical path forming device is adjusted to position the main light beam Lm and the auxiliary light beams Lp and Ln each focused by the objective lens 12 to impinge upon the disc D in such a manner that, as shown in FIG. 3, in the information recording area 32 of the disc D, a main light beam spot Qm is formed by the main light beam Lm on a spiral record track 36 and a pair of auxiliary light beam spots Qp and Qn are formed by the auxiliary light beams Lp and Ln, respectively, to be disposed with the main light beam spot Qm between, the auxiliary light beam spots Qp and Qn are respectively distant substantially the same distance from the main light beam spot Qm so as to be positioned in a relation of point symmetry to the main light beam spot Qm, and the main light beam spot Qm and each of the auxiliary light beam spots Qp and Qn have a space therebetween in the radial direction of the disc D, which corresponds to ¼ times as long as a track pitch Tp of the spiral record track 36 on the disc D, namely, a quarter of a track pitch Tp/4 so that one of the auxiliary light beam spots Qp and Qn is distant from the main light beam spot Qm toward the outer peripheral portion of the disc D to be outer than the main light beam spot Qm and the other of the auxiliary light beam spots Qp and Qn is distant from the main light beam spot Qm toward the central portion of the disc D to be inner than the main light beam spot Qm.

The photodetector 14 upon which each of the reflected main light beam Lm' and reflected auxiliary light beams Lp' and Ln' is incident is provided with a first photodetecting element for detecting the reflected main light beam Lm', a second photodetecting element for detecting the reflected auxiliary light beam Lp', and a third photodetecting element for detecting the reflected auxiliary light beam Ln'. Detection output signals obtained from the first, second and third photodetecting elements of the photodetector 14 are supplied to a signal generating circuit block 40 to produce a reproduced information signal Si, a focus error signal Sf and a tracking error signal St.

Figure 4:
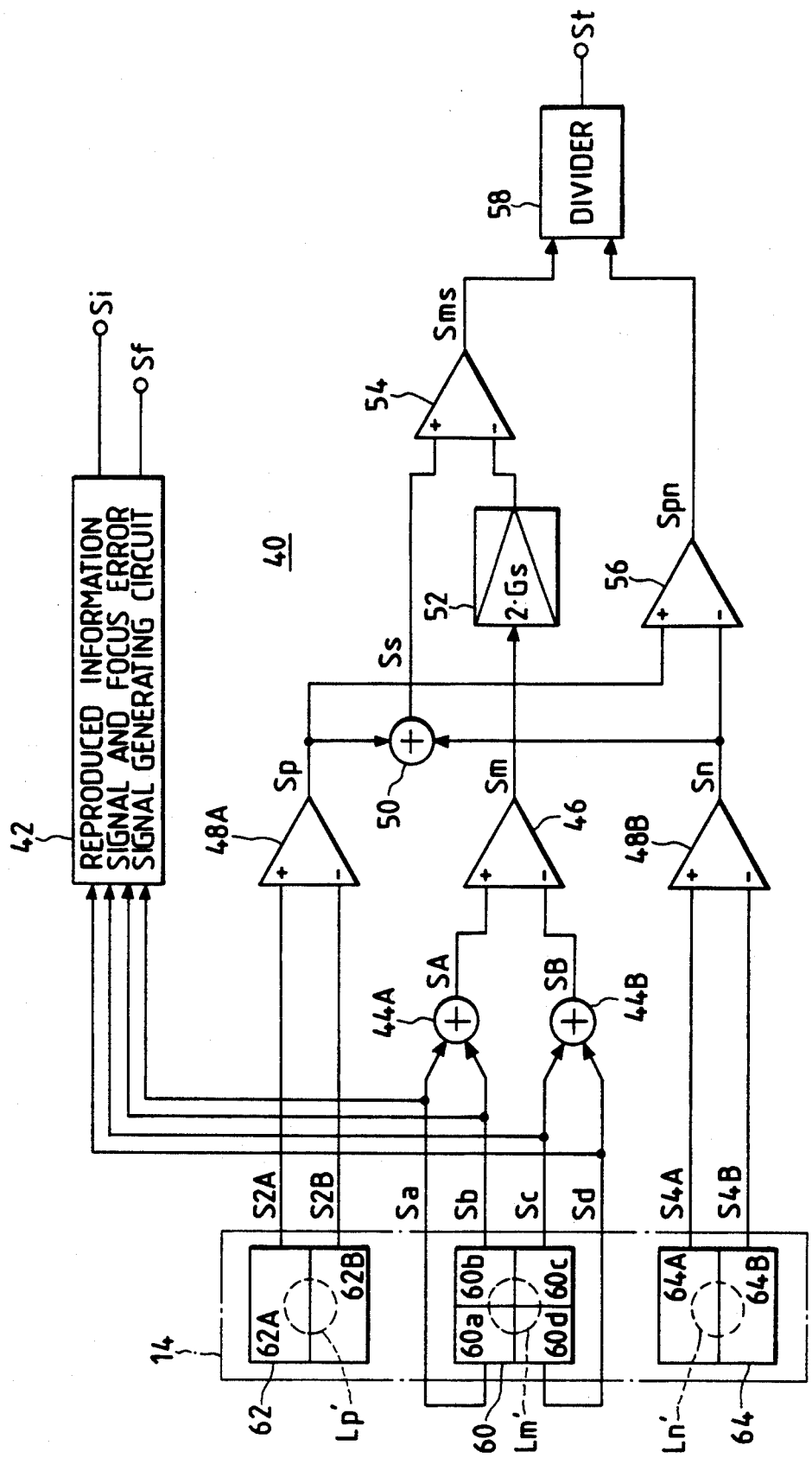
FIG. 4 is a schematic circuit diagram showing an example of an arrangement including a photodetector and a signal generating circuit, which can be applied to the embodiment shown in FIG. 1.

FIG. 4 shows one example of an embodied configuration including the photodetector 14 and the signal generating circuit block 40 which can be applied to the embodiment shown in FIG. 1.

Referring to FIG. 4, the photodetector 14 comprises a photodetecting element 60 for detecting the reflected main light beam Lm' as the first photodetecting element, which is divided into four parts 60a, 60b, 60c and 60d disposed close to one another, a photodetecting element 62 for detecting the reflected auxiliary light beam Lp' as the second photodetecting element, and a photodetecting element 64 for detecting the reflected auxiliary light beam Ln' as the third photodetecting element.

Detection output signals Sa, Sb, Sc and Sd obtained from the parts 60a, 60b, 60c and 60d of the photodetecting element 60, respectively, are supplied to a reproduced information signal and focus error signal generating circuit 42 constituting a part of the signal generating circuit block 40. In the reproduced information signal and focus error signal generating circuit 42, the reproduced information signal Si and the focus error signal Sf are separately produced based on the detection output signals Sa, Sb, Sc and Sd to be delivered.

Further, in the signal generating circuit block 40, the detection output signals Sa and Sb are added each other in an adder 44A to produce an added signal SA (=Sa+Sb) and the detection output signals Sc and Sd are added each other in an adder 44B to produce an added signal SB (=Sc+Sd). The added signals SA and SB correspond to detection outputs obtained from the photodetecting element 60 in the case where the photodetecting element 60 is divided substantially into two parts one of which is constituted by the parts 60a and 60b incorporated with each other and the other of which is constituted by the parts 60c and 60d incorporated with each other. Then, the added signals SA and SB are supplied to a pair of input terminals of a subtracter 46 and a difference signal Sm (=SA−SB) which corresponds to a level difference between the added signals SA and SB is obtained from the subtracter 46.

Further, detection output signals S2A and S2B obtained from the parts 62A and 62B of the photodetecting element 62, respectively, are supplied to a pair of input terminals of a subtracter 48A and a difference signal Sp (=S2A−S2B) which corresponds to a level difference between the detection output signals S2A and S2B is obtained from the subtracter 48A. Similarly, detection output signals S4A and S4B obtained from the parts 64A and 64B of the photodetecting element 64, respectively, are supplied to a pair of input terminals of a subtracter 48B and a difference signal Sn (=S4A−S4B) which corresponds to a level difference between the detection output signals S4A and S4B is obtained from the subtracter 48B. Then, the difference signals Sp and Sn obtained from the subtracters 48A and 48B, respectively, are added to each other in an adder 50 to produce an added signal Ss (=Sp+Sn).

The difference signal Sm obtained from the subtracter 46 is supplied to a level controller 52 to be subjected therein to level adjustment with a gain of 2·Gs and then supplied to one of input terminals of a subtracter 54. The added signal Ss obtained from the adder 50 is directly supplied to the other of input terminals of the subtracter 54. The gain 2·Gs in the level controller 52 is set in response to a ratio in intensity Gs of each of the auxiliary light beams Lp and Ln to the main light beam Lm. From the subtracter 54, a difference signal Sms (=2·Gs·Sm −Ss) which corresponds to a level difference between the difference signal Sm having been adjusted in level with the gain of 2·Gs and the added signal Ss is obtained to be supplied to one of input terminals of a divider 58.

The difference signals Sp and Sn obtained from the subtracters 48A and 48B, respectively, are supplied to a subtracter 56 and a difference signal Spn (=Sp−Sn) which corresponds to a level difference between the difference signals Sp and Sn is obtained from the subtracter 56 to be supplied to the other of the input terminals of the divider 58.

Then, a signal representing a ratio (Sms/Spn) of the difference signal Sms to the difference signal Spn is derived from the divider 58 to be the tracking error signal St.

In such a case, supposing $I_0$ stands for the intensity of the main light beam Lm, $I_1$ stands for the intensity of each of the auxiliary light beams Lp and Ln, U stands for the displacement of the main light beam spot Qm on the information recording area 32 of the disc D from the center of the spiral record track 36 in the radial direction of the disc D, since, in the information recording area 32 of the disc D, one of the auxiliary light beam spots Qp and Qn is distant by a distance corresponding to Tp/4 from the main light beam spot Qm toward the outer peripheral portion of the disc D and the other of the auxiliary light beam spots Qp and Qn is distant by the distance corresponding to Tp/4 from the main light beam spot Qm toward the central portion of the disc D, the following equations are satisfied.

$$\begin{aligned}
Sm &= SA - SB \\
&= I_0\{a \cdot \sin(2\pi \cdot U/Tp) + b\} \\
Sp &= S2A - S2B \\
&= I_1[a \cdot \sin\{2\pi(U + Tp/4)/Tp\} + b] \\
&= I_1\{-a \cdot \cos(2\pi \cdot U/Tp) + b\} \\
Sn &= S4A - S4B \\
&= I_1[a \cdot \sin\{2\pi(U - Tp/4)/Tp\} + b] \\
&= I_1\{a \cdot \cos(2\pi \cdot U/Tp) + b\}
\end{aligned}$$

where a stands for amplitude and b stands for a DC offset component.

Since the equation: $Gs = I_1/I_0$ is satisfied, the following equations are further satisfied.

$$\begin{aligned}
Sms &= 2 \cdot Gs \cdot Sm - (Sp + Sn) \\
&= 2 \cdot I_1\{a \cdot \sin(2\pi \cdot U/Tp) + b\} - 2 \cdot I_1 \cdot b \\
&= 2 \cdot I_1 \cdot a \cdot \sin(2\pi \cdot U/Tp) \\
Spn &= Sp - Sn \\
&= 2 \cdot I_1 \cdot a \cdot \cos(2\pi \cdot U/Tp)
\end{aligned}$$

As a result, the tracking error signal St is expressed with the following equation:

$$\begin{aligned}
St &= Sms/Spn \\
&= \sin(2\pi \cdot U/Tp)/\cos(2\pi \cdot U/Tp)\} \\
&= \tan(2\pi \cdot U/Tp)
\end{aligned}$$

Accordingly, the tracking error signal St obtained from the divider 58 does not include the DC offset component and has a constant amplitude regardless of variations in amplitude of each of the difference signals Sm, Sp and Sn, that is, variations in amplitude of each of detection output signals Sa, Sb, Sc and Sd from the photodetecting element 60, the detection output signals S2A and S2B from the photodetecting element 62 and the detection output signals S4A and S4B from the photodetecting element 64, the intensity $I_0$ of the main light beam Lm, and the intensity $I_1$ of each of the auxiliary light beams Lp and Ln. Consequently, the tracking error signal St is produced to have the constant amplitude without variations in response to variations in depth of the spiral guide groove 34 preformed on the disc D, variations in depth of each of the pits or in height of each of the bumps forming the spiral record track 36, variations in reflectance to a light beam of the disc D or variations in quantity of each of the main light beam Lm and auxiliary light beams Lp and Ln impinging on the disc D.

APPLICABILITY FOR INDUSTRIAL USE

Although the example of the optical unit and the signal generating circuit block of the aforementioned embodiment constitutes the information reproducing system applied to, for example, the optical disc player, it is to be understood that the present invention can be also applied to an optical unit and a signal generating circuit block which constitute an information recording system applied to, for example, the optical disc player, in which a main light beam and a plurality of auxiliary light beams are caused to impinge upon an optical disc-shaped record medium for recording thereon information signals and, after reflected by the optical disc-shaped record medium, used for producing a tracking error signal.

What is claimed is:

1. An optical recording and/or reproducing apparatus comprising an optical arrangement including light beam generating means (10) for producing a light beam (L), light beam dividing means (22) for dividing the light beam (L) from the light beam generating means (10) into a main light beam (Lm) and at least two auxiliary light beams (Lp,Ln), photosensing means (14), and optical path forming means for causing the main light beam (Lm) and two auxiliary light beams (Lp,Ln) obtained from the light beam dividing means (22) to impinge upon a disc-shaped record medium (D) and for guiding the main light beam (Lm') and two auxiliary light beams (Lp',Ln') emanating from the disc-shaped record medium (D) to the photosensing means (14), and a signal generating circuit block (40) operative to produce signals based on detection outputs obtained from the photosensing means (14), wherein the optical path forming means is so constituted that two auxiliary light spots (Qp,Qn) are formed on the disc-shaped record medium (D) by two auxiliary light beams (Lp,Ln), respectively, in such a manner that one of the auxiliary light beam spots (Qp,Qn) is distant substantially a distance corresponding to a quarter of a track pitch (Tp) from a main light beam spot (Qm) formed on the disc-shaped record medium (D) by the main light beam (Lm) toward an outer peripheral portion of the disc-shaped record medium (D) along a radial direction of the disc-shaped record medium (D) and the other of the auxiliary light beam spots (Qp,Qn) is distant substantially the distance corresponding to a quarter of the track pitch (Tp) from the main light beam spot (Qm) toward a central portion of the disc-shaped record medium (D) along the radial direction of the disc-shaped record medium (D); the photosensing means (14) is provided with a first photodetecting element (60) divided substantially into two parts for detecting the main light beam (Lm') from the disc-shaped record medium (D), a second photodetecting element (62) divided substantially into two parts for detecting one of two auxiliary light beams (Lp',Ln') from the disc-shaped record medium (D) and a third photodetecting element (64) divided substantially into two parts for detecting the other of two auxiliary light beams (Lp',Ln') from the disc-shaped record medium (D); and the signal generating circuit block (40) is constituted to obtain a first difference signal (Sm) between detection output signals obtained respectively from the two parts of the first photodetecting element(60), a second difference signal (Sp) between detection output signals obtained respectively from the two parts of the second photodetecting element (62) and a third difference signal (Sn) between detection output signals obtained respectively from the two parts of the third photodetecting element (64), and then to produce a tracking error signal (St) based on a ratio of a difference between the first difference signal (Sm) and the sum of the second and third difference signals (Sp,Sn) in relation to a difference between the second and third differences signals (Sp,Sn).

2. An optical recording and/or reproducing apparatus according to claim 1, wherein the main light beam spot (Qm) formed on the disc-shaped record medium (D) by the main light beam (Lm) is positioned on a record track (36).

3. An optical recording and/or reproducing apparatus according to claim 1, wherein the signal generating circuit block (40) includes level controlling means (52) for controlling the level of the first difference signal (Sm) in accordance with a ratio in intensity of each of the auxiliary light beams (Lp,Ln) in relation to the main light beam (Lm).

* * * * *